(12) United States Patent
Chang

(10) Patent No.: US 10,017,008 B1
(45) Date of Patent: Jul. 10, 2018

(54) SUBSIDIARY LOUDSPEAKER FOR VEHICLES AND BIKES

(71) Applicant: LIANG FEI INDUSTRY CO., LTD., Changhua Hsien (TW)

(72) Inventor: Chin-Chuan Chang, Changhua Hsien (TW)

(73) Assignee: LIANG FEI INDUSTRY CO., LTD., Changhua Hsien (TW)

( * ) Notice: Subject to any disclaimer, the term of this patent is extended or adjusted under 35 U.S.C. 154(b) by 0 days.

(21) Appl. No.: 15/625,753

(22) Filed: Jun. 16, 2017

(51) Int. Cl.
| | |
|---|---|
| B60Q 5/00 | (2006.01) |
| B60C 5/00 | (2006.01) |
| B62J 3/00 | (2006.01) |
| G06F 3/16 | (2006.01) |
| H04R 1/02 | (2006.01) |
| G10K 15/02 | (2006.01) |
| H04R 3/00 | (2006.01) |

(52) U.S. Cl.
CPC .............. B60C 5/008 (2013.01); B62J 3/00 (2013.01); G06F 3/165 (2013.01); G10K 15/02 (2013.01); H04R 1/028 (2013.01); H04R 3/00 (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 5,237,617 | A * | 8/1993 | Miller | G09B 9/05 381/61 |
| 7,979,147 | B1 * | 7/2011 | Dunn | G10K 15/02 181/192 |
| 2006/0074645 | A1 * | 4/2006 | Tischer | G10K 15/02 704/226 |
| 2007/0182525 | A1 * | 8/2007 | McCarthy | G10K 15/02 340/425.5 |
| 2011/0010269 | A1 * | 1/2011 | Ballard | B60Q 5/008 705/26.41 |
| 2012/0106748 | A1 * | 5/2012 | Peachey | B60Q 5/00 381/61 |
| 2014/0321659 | A1 * | 10/2014 | Buganza | F01N 1/065 381/71.4 |
| 2014/0328493 | A1 * | 11/2014 | Wirth | H04R 1/028 381/86 |
| 2015/0199955 | A1 * | 7/2015 | Draganic | G10K 15/02 381/86 |
| 2015/0245198 | A1 * | 8/2015 | Fliege | G08C 17/02 455/420 |
| 2017/0248048 | A1 * | 8/2017 | Dziurda | F01N 1/165 |

* cited by examiner

*Primary Examiner* — Paul Huber
(74) *Attorney, Agent, or Firm* — Guice Patents PLLC

(57) ABSTRACT

The invention relates to a subsidiary loudspeaker for vehicles and bikes, including a tail pipe, a host module and an eternal controller; the host module receives imitation commands from the external controller, a central processing unit operates and outputs a control signal according to the detected parameter values of power rotation speed and vehicle speed to adjust the imitated exhaust sound output by a speaker in the tail pipe; to thereby adjust the exhaust sound, to meet low noise requirements of environmental law and reduce occurrence of vehicle accidents.

7 Claims, 4 Drawing Sheets

SUBSIDIARY LOUDSPEAKER FOR VEHICLES AND BIKES

BACKGROUND OF THE INVENTION a) Field of the Invention

The invention relates to a subsidiary loudspeaker and, more particularly, a subsidiary loudspeaker for vehicles and bikes provided to output a corresponding imitated exhaust sound according to parameter values of the power rotation speed and the vehicle speed, to thereby adjust the exhaust sound, to meet low noise requirements of environmental law and reduce occurrence of vehicle accidents, to improve driving safety effectively.

b) Description of Prior Art

Nearly a decade, no-exhaust or low-noise vehicles (such as electric vehicles, low carbon emission diesel vehicles) become a new mainstream of vehicles and bikes development due to environmental concepts. These types of vehicles are usually quiet when running, so everyone's alertness may be reduced greatly, pedestrians or other vehicle drivers on roads often do not have enough time to react when finding out the vehicles come and therefore a lot of traffic accidents may occur. This is an unexpected new problem under the condition that environmental protection and energy conservation are respected. For this reason, the industry produced various active acoustic bafflers for improving or increasing sounds similar to vehicle engine exhaust in the low noise range permitted by environmental laws, so the vehicles could generate proper driving sounds to achieve warning effect that pedestrians or other vehicle drivers can be alert to coming vehicles, to thereby ensure driving safety to reduce the incidence of accidents.

The related techniques of active acoustic bafflers could refer to the cited references EP 2581567 B1, EP 2590163 A2, EP 2607638 A2, EP 2610457 A1, DE 102009049280 B4, the technical skills of the cited references are generally based on detecting exhaust sound in exhaust system, a control signal is correspondingly send for operating the speaker of the active acoustic baffler according to the detected volume of exhaust sound, so that an imitated sound similar to exhaust sound is generated, mixed with actual exhaust sound and output from the tail pipe. Although a expected exhaust sound could be generated in this way, there are still some problems in the actual implementation, for example:

1. The conventional detection method can not be applied to all vehicles, especially electric vehicles, because there is no internal combustion engine set in electric vehicles, no exhaust for detection.

2. When the vehicle is idle, the vehicle does not move and the engine of vehicles or bikes does not stop, but exhaust system is still in exhaust state, so the detected exhaust sound can not fully show the actual vehicle driving state.

3. Since the known active acoustic bafflers are big, it should fit for the existing exhaust pipe system of vehicles and be limited by space of chassis, the installation is limited; and there are various styles and types of vehicles, the commonality is not enough, so it is troublesome in installation.

SUMMARY OF THE INVENTION

In view of drawbacks of the prior art, the inventor finally completes subsidiary loudspeaker for vehicles and bikes of the present invention after numerous improvements, namely, the object of the present invention is to provide a subsidiary loudspeaker for vehicles and bikes for outputting a corresponding imitated exhaust sound according to parameter values of the power rotation speed and the vehicle speed, to thereby adjust the exhaust sound, to meet low noise requirements of environmental laws and reduce occurrence of vehicle accidents, to improve driving safety effectively.

To achieve the above object according to the invention, the subsidiary loudspeaker for vehicles and bikes of the present invention includes a tail pipe, a host module and an external controller.

The tail pipe, which includes an housing and a speaker, an internal space and a sound output are set on the housing, the speaker is set inside the internal space and fixed to the housing.

The host module, which includes a power rotation speed and vehicle speed detection unit, a central processing unit, a receiving unit and an output unit; the power rotation speed and vehicle speed detection unit is used to detect the power rotation speed and vehicle speed of vehicles and transmit to the central processing unit; the central processing unit is used to operate the parameter values detected by the power rotation speed and vehicle speed detection unit and the setting values of imitation commands of the external controller to output a control signal to the output unit; a connecting cable is used to connect the output unit with the speaker, the control signal output by the central processing unit is provided to control the sound output of the speaker.

The external controller, which is provided to output the imitation command to the receiving unit of the host module wirelessly according to driver's operation commands, the imitation command includes a type of imitated sound and a setting volume.

The above external controller is a mobile phone, an APP control program for imitated sound is installed in the mobile phone.

The above external controller is a wireless remote control, a control program for imitated sound is installed in the wireless remote control.

The housing of the above tail pipe is consisted of a central housing, a rear housing and a front oblique cover; the rear housing is a closed end, the rear housing is connected to the rear side of the central housing, the speaker is set inside the rear housing; the sound output is set on the front side of the front oblique cover, the sound output is the sound output for the imitated exhaust sound played by the speaker; a first engaging portion is further set on the front end of the front oblique cover, the first engaging portion is engaged with a second engaging portion set on one end of an external pipe.

The above power rotation speed and vehicle speed detection unit, which is provided to detect the parameter values of power rotation speed and vehicle speed of vehicles, the parameter value of the power rotation speed is the rotation speed of engines for gasoline and diesel vehicles, and the rotation speed is captured as the parameter value; the parameter value of the power rotation speed is the rotation speed of motors for electric vehicles.

DETAILED DESCRIPTION OF THE INVENTION

Figure 1:
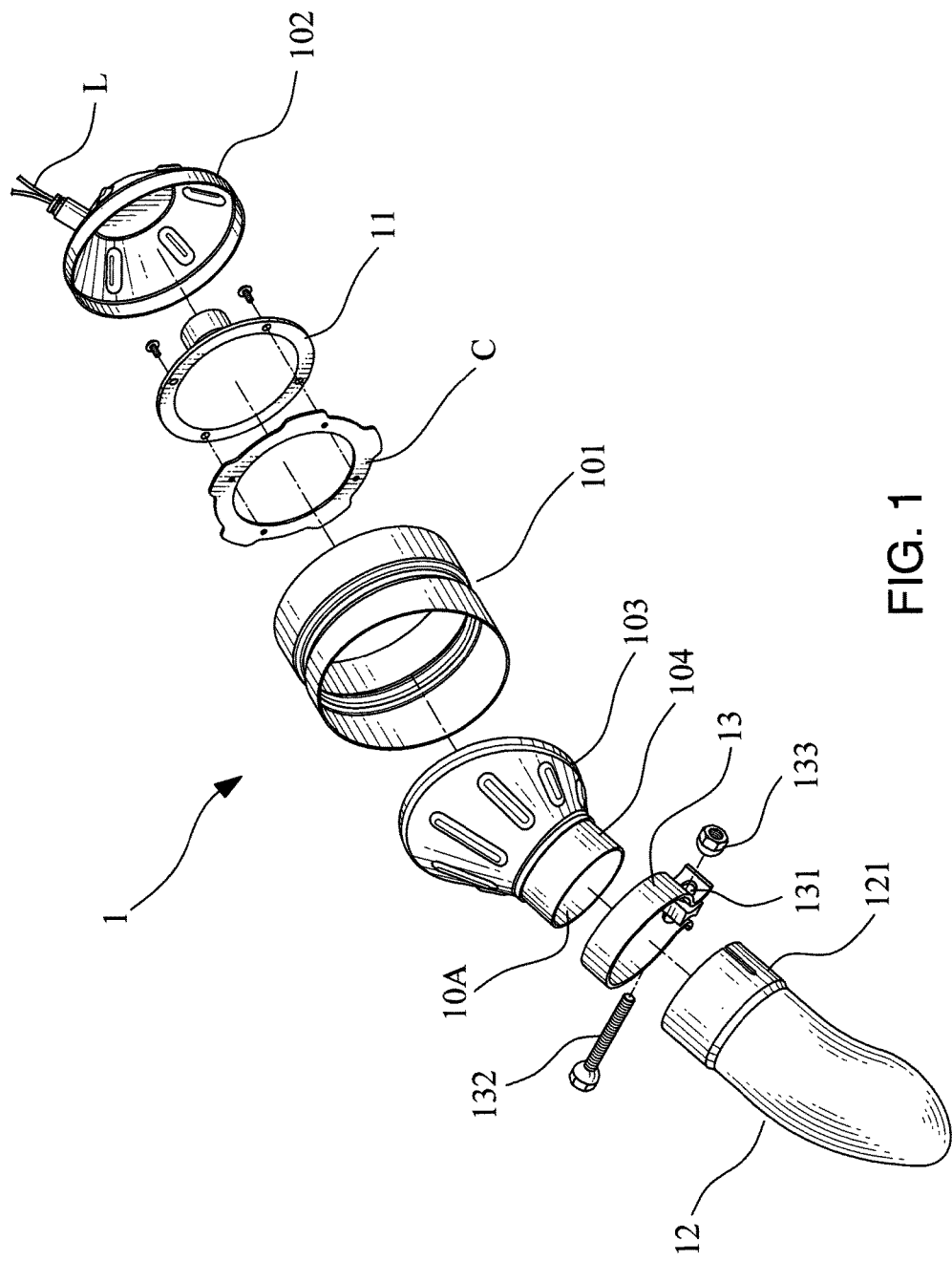
FIG. 1 is a three-dimensional exploded schematic diagram of the present invention.
Figure 2:
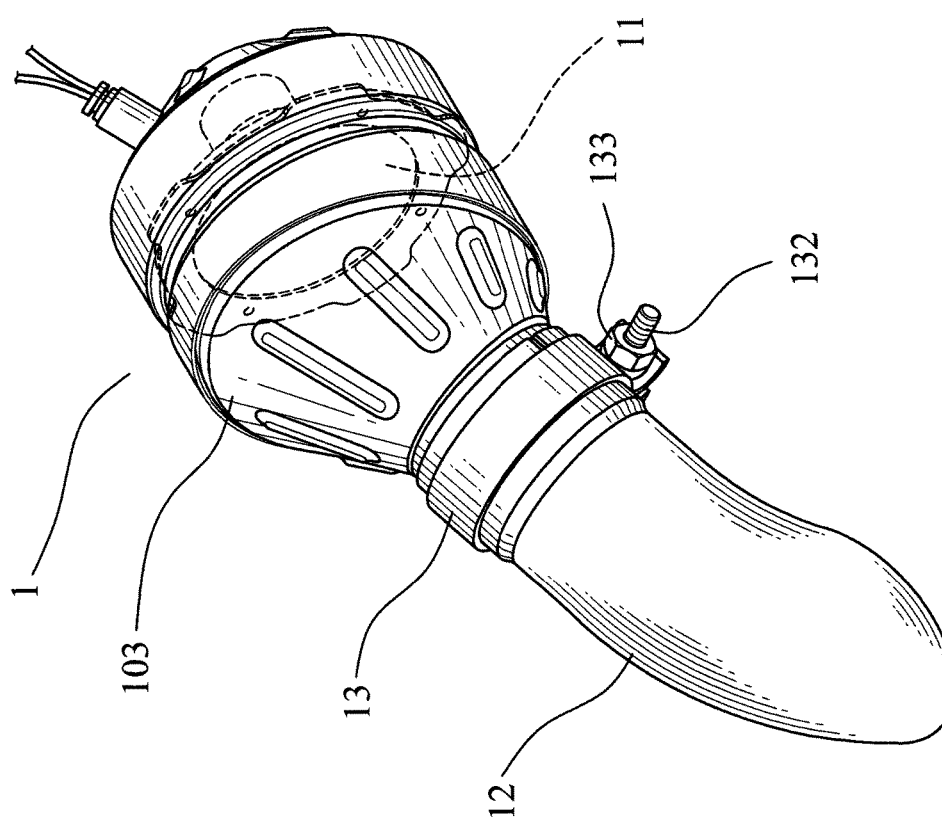
FIG. 2 is a three-dimensional schematic diagram of the present invention.
Figure 3:
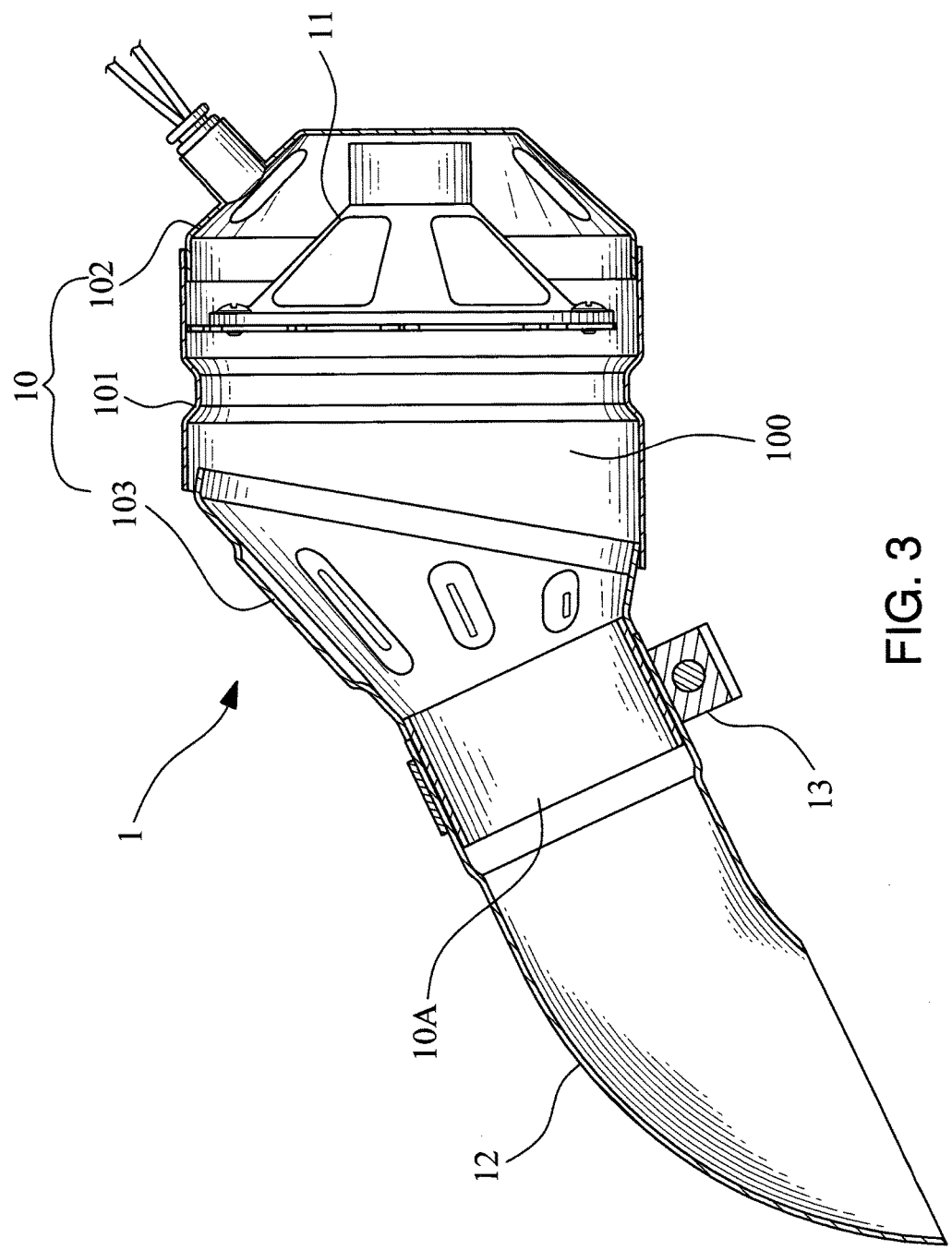
FIG. 3 is a cross section diagram of the present invention.

Please refer to FIG. 1 to FIG. 4, the subsidiary loudspeaker of the present invention includes a tail pipe 1, a host module 2 and an external controller 3.

The tail pipe 1, which includes an housing 10 and a speaker 11, an internal space 100 and a sound output 10A are set on the housing 10, the speaker 11 is set inside the internal space 100 and fixed to the housing 10.

The host module 2, which includes a power rotation speed and vehicle speed detection unit 21, a central processing unit 22, a receiving unit 23 and an output unit 24; the power rotation speed and vehicle speed detection unit 21 is used to detect the power rotation speed and vehicle speed of vehicles and transmit to the central processing unit 22; the central processing unit 22 is used to operate the parameter values detected by the power rotation speed and vehicle speed detection unit 21 and the setting values of imitation commands of the external controller 3 to output a control signal to the output unit 24; a connecting cable L is used to connect the output unit 24 with the speaker 11, the control signal output by the central processing unit 22 is provided to control the sound output of the speaker 11.

The external controller 3, which is provided to output the imitation command to the receiving unit 23 of the host module 2 wirelessly according to driver's operation commands; the imitation command includes a type of imitated sound and a setting volume.

The above external controller 3 is a mobile phone, an APP control program for imitated sound is installed in the mobile phone, a user could choose the type of imitated sound and the volume of exhaust sound through the APP control program for imitated sound installed in the mobile phone.

The above external controller 3 is a wireless remote control, a user could choose the type of imitated sound and the volume of exhaust sound through a control program for imitated sound installed in the wireless remote control.

The power rotation speed and vehicle speed detection unit 21 is provided to detect parameter values of power rotation speed and vehicle speed of vehicles, wherein parameter value of the power rotation speed is the rotation speed of engine for gasoline and diesel vehicles, such as rpm, the rotation speed is captured as the parameter value; the parameter value of the vehicle speed is the distance that the vehicle drives per unit time (such as km/hr), the vehicle speed is captured as the parameter value.

The tail pipe 1, its housing 10 is consisted of a central housing 101, a rear housing 102 and a front oblique cover 103; the rear housing 102 is a closed end, the rear housing 102 is connected to the rear side of the central housing 101, the speaker 11 is set inside the rear housing 102; the sound output 10A is set on the front side of the front oblique cover 103, the sound output 10A is the sound output for the imitated exhaust sound played by the speaker 11.

In the present invention, in order to enhance the airtight effect of the internal space 100 of the housing 10, an airtight gasket C is set between the rear housing 102 and the central housing 101 to ensure that the imitated sound played by the speaker could successfully transfer to the sound output 10A of the front oblique cover 103 after the housing 10 is assembled. Please refer to FIGS. 1-3, the speaker 11 is connected to the airtight gasket C.

The above front oblique cover 103, its housing is funnel shape with a single oblique opening, the cross section more close to the sound output 10A is gradually narrowed to thereby achieve sound collection effect.

The above front oblique cover 103, a first engaging portion 104 is further set in its front end, the first engaging portion 104 is engaged with a second engaging portion 121 set on one end of an external pipe 12 (the other end of the external pipe 12 is engaged with the exhaust system of the vehicle, it is prior art, so it is not shown in figure), the first engaging portion 104 is engaged with the second engaging portion 121, and s clamp ring 13 is set on the outer periphery at the engaging position, a bolt 132 is used to pass one end through a fastening hole 131 of the clamp ring 13 and fasten to a nut 133 to tightly clamp the first engaging portion 104 and the second engaging portion 121.

Figure 4:
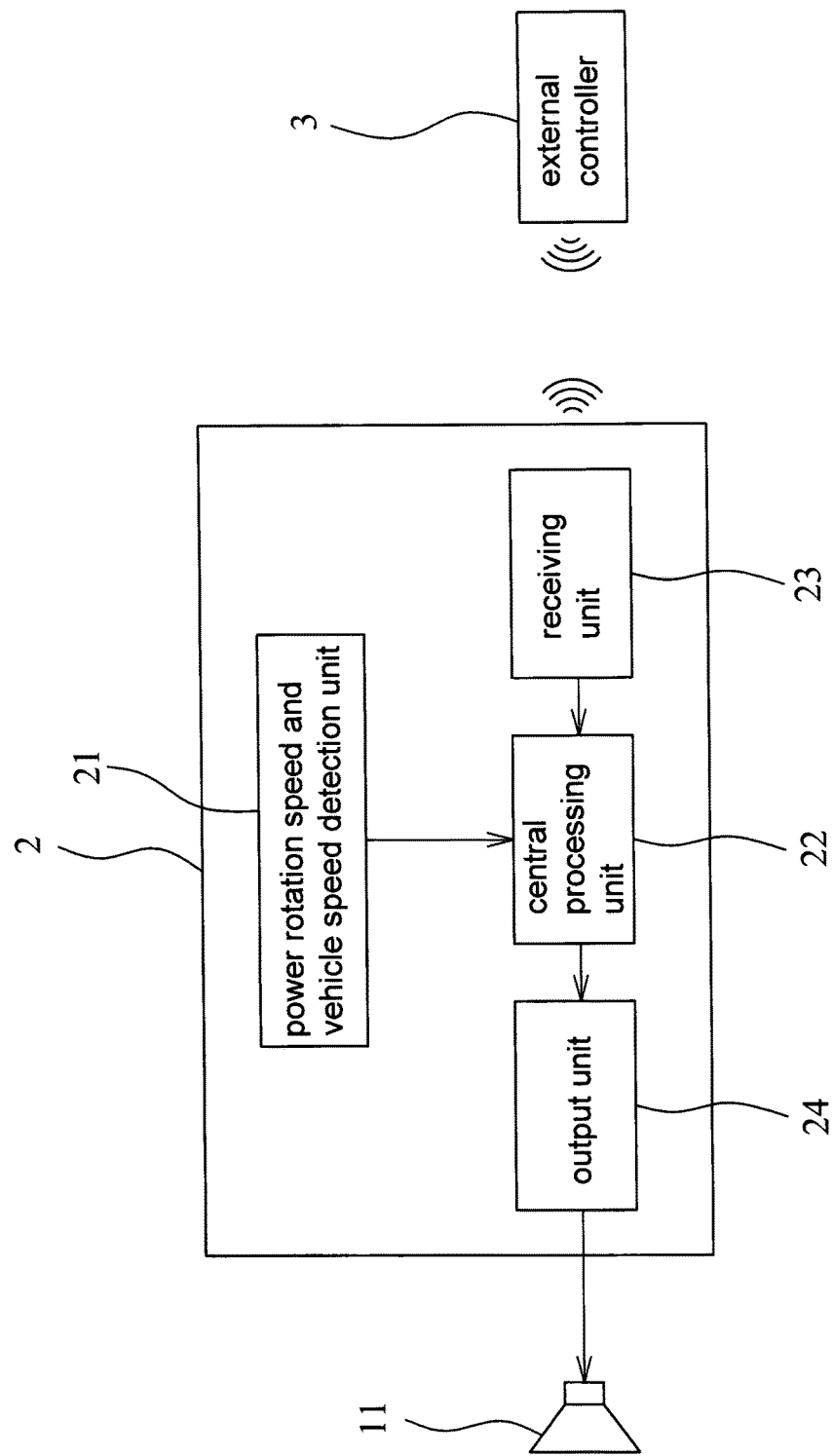
FIG. 4 is a block diagram of the host module of the present invention.

Please refer to FIG. 4, by using the present invention, after the vehicle starts, the driver could operate imitation commands through the external controller 3 according to personal preferences, such as using an APP control program for imitated sound installed in the mobile phone, a control program for imitated sound installed in the wireless remote control, the imitation commands are used to choose and set the type of imitated sound and the volume of exhaust sound; the receiving unit 23 receives the imitation commands and transfers to the central processing unit 22; the power rotation speed and vehicle speed detection unit 21 detects parameter values of the power rotation speed and the vehicle speed and transfers to the central processing unit 22 for operating with the setting value of the imitation commands, and the central processing unit 22 outputs a control signal to the output unit 24 to control the sound output of the speaker 11.

The volume of the subsidiary loudspeaker of the present invention is small and it is easy to install in the narrow space of the chassis, so it could be used in various vehicles, the output imitated exhaust sound could be individually and directly play from the sound output 10A of the tail pipe 1, in this way, it is especially applicable for electric vehicles without exhaust. Besides, the tail pipe 1 could be used to engaged with one end of the external pipe 12, the other end of the external pipe 12 is engaged with pipes of the exhaust system of vehicles, such engagement way provides to mix the imitated exhaust sound and the actual exhaust sound to output externally, it is especially applicable for common gasoline and diesel vehicles.

Above all, the subsidiary loudspeaker of the present invention could output a corresponding imitated exhaust sound according to the parameter values of the power rotation speed and the vehicle speed, to thereby adjust the exhaust sound, to meet low noise requirements of environmental laws and reduce occurrence of vehicle accidents, to improve driving safety effectively.

What is claimed is:

1. A subsidiary loudspeaker for vehicles and bikes, comprising: a tail pipe, a host module and an external controller, wherein:

the tail pipe, which includes an housing and a speaker, an internal space and a sound output are set on the housing, the speaker is set inside the internal space and fixed to the housing;

the host module, which includes a power rotation speed and vehicle speed detection unit, a central processing unit, a receiving unit and an output unit; the power rotation speed and vehicle speed detection unit is used to detect the power rotation speed and vehicle speed of vehicles and transmit to the central processing unit; the central processing unit is used to operate parameter values detected by the power rotation speed and vehicle speed detection unit and setting values of imitation commands of the external controller to output a control signal to the output unit; a connecting cable is used to connect the output unit with the speaker, the control signal output by the central processing unit is provided to control the sound output of the speaker;

the external controller, which is provided to output the imitation command to the receiving unit of the host module wirelessly according to driver's operation commands, the imitation command includes a type of imitated sound and a setting volume;

the housing includes a rear housing, a front oblique cover, and a central housing located between the rear housing and the front oblique cover, the internal space of the housing is defined by the central housing, the rear housing, and the front oblique cover; and an airtight gasket located between the rear housing and the central housing, the speaker is connected to the airtight gasket.

2. The subsidiary loudspeaker for vehicles and bikes as claimed in claim 1, wherein the external controller is a mobile phone, an APP control program for imitated sound is installed in the mobile phone.

3. The subsidiary loudspeaker for vehicles and bikes as claimed in claim 1, wherein the external controller is a wireless remote control, a control program for imitated sound is installed in the wireless remote control.

4. The subsidiary loudspeaker for vehicles and bikes as claimed in claim 1, wherein the housing of the tail pipe is consisted of a central housing, a rear housing and a front oblique cover; the rear housing is a closed end, the rear housing is connected to the rear side of the central housing, the speaker is set inside the rear housing; the sound output is set on the front side of the front oblique cover, the sound output is the sound output for the imitated exhaust sound played by the speaker.

5. The subsidiary loudspeaker for vehicles and bikes as claimed in claim 1, wherein the housing of the tail pipe is consisted of a central housing, a rear housing and a front oblique cover; a first engaging portion is further set on the front end of the front oblique cover, the first engaging portion is engaged with a second engaging portion set on one end of an external pipe.

6. The subsidiary loudspeaker for vehicles and bikes as claimed in claim 1, wherein the parameter values of the power rotation speed is the rotation speed of engines for gasoline and diesel vehicles, and the rotation speed is captured as a parameter value of the parameter values.

7. The subsidiary loudspeaker for vehicles and bikes as claimed in claim 1, wherein the power rotation speed and vehicle speed detection unit is provided to detect parameter values of power rotation speed and vehicle speed of vehicles, the parameter value of the power rotation speed is the rotation speed of motors for electric vehicles, and the rotation speed is captured as a parameter value of the parameter values.

* * * * *